United States Patent
Kosowski (10) Patent No.: US 12,535,254 B2
(45) Date of Patent: Jan. 27, 2026

(54) APPARATUS AND METHOD FOR COOLING MILK BY SELECTIVELY ACTIVATING A SUBSET OF COMPRESSORS

(71) Applicant: DELAVAL HOLDING AB, Tumba (SE)

(72) Inventor: Maciej Kosowski, Tumba (SE)

(73) Assignee: DeLaval Holding AB, Tumba (SE)

( * ) Notice: Subject to any disclaimer, the term of this patent is extended or adjusted under 35 U.S.C. 154(b) by 307 days.

(21) Appl. No.: 18/251,679

(22) PCT Filed: Nov. 1, 2021

(86) PCT No.: PCT/SE2021/051091
§ 371 (c)(1),
(2) Date: May 3, 2023

(87) PCT Pub. No.: WO2022/098278
PCT Pub. Date: May 12, 2022

(65) Prior Publication Data
US 2024/0003606 A1   Jan. 4, 2024

(30) Foreign Application Priority Data
Nov. 3, 2020 (SE) .................... 2051276-0

(51) Int. Cl.
*A23B 11/14* (2025.01)
*F25B 25/00* (2006.01)
*F25B 49/02* (2006.01)

(52) U.S. Cl.
CPC ............ *F25B 49/022* (2013.01); *A23B 11/14* (2025.01); *F25B 25/005* (2013.01);
(Continued)

(58) Field of Classification Search
CPC .... F25B 1/10; F25B 7/00; F25B 25/00; F25B 49/022; F25B 2400/075; F25B 2400/06;
(Continued)

(56) References Cited

U.S. PATENT DOCUMENTS

| | | | |
|---|---|---|---|
| 2004/0107710 A1* | 6/2004 | Lee | ............ F25B 13/00 236/44 R |
| 2020/0008389 A1 | 1/2020 | Stopa | |

FOREIGN PATENT DOCUMENTS

| | | |
|---|---|---|
| CN | 102434992 B | 4/2014 |
| CN | 105865066 A | 8/2016 |

(Continued)

OTHER PUBLICATIONS

Search Report for SE Application No. 2051276-0 mailed Jun. 1, 2021, 2 pages.
International Search Report for PCT/SE2021/051091 mailed Jan. 27, 2022, 3 pages.
Written Opinion of the ISA for PCT/SE2021/051091 mailed Jan. 27, 2022, 8 pages.
(Continued)

*Primary Examiner* — Jerry-Daryl Fletcher
*Assistant Examiner* — Daniel C Comings
(74) *Attorney, Agent, or Firm* — NIXON & VANDERHYE (57) ABSTRACT

An apparatus and method for cooling down milk in a milk cooling apparatus, where the milk cooling apparatus includes a coolant circuit with a milk cooling heat exchanger for heat exchange between milk and the coolant, and also includes a chiller with a refrigerant circuit for heat exchange between a refrigerant and the coolant, where the method includes measuring an OUT-temperature of the coolant upstream of the milk cooling heat exchanger and downstream a coolant cooling heat exchanger, and operating one or more compressors based on the measured OUT-temperature to minimize a difference between the measured OUT-
(Continued)

temperature and a desired OUT-temperature, and also measuring an IN-temperature of the coolant upstream the coolant cooling heat exchanger and downstream the milk cooling heat exchanger, where the method configures how many compressors of the one or more compressors being active at a certain OUT-temperature based on the measured IN-temperature.

15 Claims, 5 Drawing Sheets

(52) U.S. Cl.
CPC .............. *F25B 2400/075* (2013.01); *F25B 2600/0251* (2013.01); *F25B 2700/21172* (2013.01); *F25B 2700/21173* (2013.01)

(58) Field of Classification Search
CPC ............ F25B 2700/21172; F25B 2700/21173; A23B 11/14; A23B 11/1403
See application file for complete search history.

(56) References Cited

FOREIGN PATENT DOCUMENTS

| | | | | |
|---|---|---|---|---|
| EP | 2594839 A2 | 5/2013 | | |
| GB | 2547806 A | 8/2017 | | |
| WO | 9716962 A1 | 5/1997 | | |
| WO | WO-2008138367 A1 | * | 11/2008 | ............ F25B 25/005 |
| WO | 2018111184 A1 | 6/2018 | | |
| WO | WO-2020046139 A1 | * | 3/2020 | ............... A23C 3/04 |

OTHER PUBLICATIONS

NA1557, "Multi-machine parallel chiller controller", fan35087, https://www.doc88.com/p-7458309851834.html, Jan. 6, 2015, pp. 1-10.

Office Action, issued in Chinese Patent Application No. 202180072967.9 dated Apr. 28, 2025.

* cited by examiner

APPARATUS AND METHOD FOR COOLING MILK BY SELECTIVELY ACTIVATING A SUBSET OF COMPRESSORS

CROSS-REFERENCE TO RELATED APPLICATIONS

This application is the U.S. national phase of International Application No. PCT/SE2021/051091 filed Nov. 1, 2021 which designated the U.S. and claims priority to SE Patent Application No. 2051276-0 filed Nov. 3, 2020, the entire contents of each of which are hereby incorporated by reference.

TECHNICAL FIELD

The present disclosure relates to technology for cooling down milk, and in particular to an apparatus including a chiller that cools down a cooling fluid used for cooling milk in a heat exchanger. The disclosure also relates to a method for cooling down milk.

BACKGROUND

Milk collected at a farm needs to be cooled down fast to reduce risks of bacterial growth. In order to deliver premium milk, the milk has to have a high quality when delivered to the dairy. There are many factors involved in providing milk with high quality, such as feed quality and herd health, but once milk leaves the teat, the cooling process is very important to safeguard milk quality.

If cooling is done only in a storage tank, the milk might not be cooled down fast enough to maintain its quality. Warm milk is a breeding ground for bacteria, and the amount of bacteria doubles every 20 minutes. Thus, cooling down milk quickly minimizes bacterial growth and safeguards milk quality. By using instant cooling with a heat exchanger directly or shortly after milking, the temperature of the milk can be reduced fast where after the cooled milk can be transported to a cooling tank for storage and further cooling.

A chiller can be used to cool down a cooling fluid that circulates between the chiller and the heat exchanger. The chiller typically works by vapor compression or vapor absorption. The chiller includes one or more compressors used in the cooling process to cool down the cooling fluid before it leaves the chiller. A common solution is to regulate the cooling process based on the temperature of the outgoing cooling fluid from the chiller. If based on the temperature of the outgoing cooling fluid there is a need to increase the cooling capacity, the number of compressors that are operating may then be increased. Thus, the temperature of the outgoing cooling fluid is used to control when the compressors are operating, thus, when they are on. The higher the temperature of the outgoing cooling fluid, the more compressors should be operating to efficiently cool down the cooling fluid.

The milk flow into the heat exchanger may vary, for example depending on the number of animals at the farm being milked at the same time. When the milk flow into the heat exchanger varies, the cooling need in the heat exchanger also varies. However, the chiller will not detect that there is a change in cooling need until a change in temperature of the outgoing coolant from the chiller is detected. Thus the system may react slowly to such variations, which may result in less effective cooling in the heat exchanger, and a higher cooling need in the milk-cooling tank.

SUMMARY

It is an object of the present disclosure to alleviate at least some of the drawbacks with the prior art. Thus, it is an object of the disclosure to provide efficient cooling of milk in a milk-cooling heat exchanger. It is a further object to provide efficient cooling of milk in a milk-cooling heat exchanger that reduce wear to compressors used for cooling a refrigerant used for indirect cooling of the milk in the milk-cooling heat exchanger.

These objects and others are at least partly achieved by the method and apparatus according to the independent claims, and by the embodiments according to the dependent claims.

According to a first aspect, the disclosure relates to a method for cooling down milk in a milk-cooling apparatus comprising a coolant circuit arranged for circulating coolant. The coolant circuit comprises a milk-cooling heat exchanger configured for heat exchange between milk and the coolant. The milk-cooling apparatus further comprises a chiller comprising a refrigerant circuit comprising a coolant-cooling heat exchanger configured for heat exchange between a refrigerant and the coolant. The refrigerant circuit further comprises one or more compressors arranged for compressing the refrigerant in a cool down process of the refrigerant. The method comprises measuring an OUT-temperature indicative of a temperature of the coolant upstream the milk-cooling heat exchanger and downstream the coolant-cooling heat exchanger and operating the one or more compressors based on the measured OUT-temperature, in order to minimize a difference between the measured OUT-temperature and a desired OUT-temperature. The method further comprises measuring an IN-temperature of the coolant indicative of the temperature of the coolant upstream the coolant-cooling heat exchanger and downstream the milk-cooling heat exchanger; and configuring how many compressors of the one or more compressors being active at a certain OUT-temperature based on the measured IN-temperature.

The proposed method provides efficient cooling of milk in the milk-cooling heat exchanger, as it will react to changes of the incoming milk flow to the milk-cooling heat exchanger before they are detected via the measured OUT-temperature. The IN-temperature of the coolant is related to the flow of the incoming warm milk to the milk-cooling heat exchanger. For example, if the flow rate of the warm milk is increased, the IN-temperature will increase. If the flow rate of the warm milk is decreased, the IN-temperature will decrease. The variation in the measured IN-temperature reflects the change in flow of the warm milk. The present method adapts the capacity of the chiller based on the measured IN-temperature, such that the chiller can react faster to changes in the flow rate and thereby cool down the milk in the milk-cooling heat exchanger more efficiently. As the chiller reacts earlier to changes, the OUT-temperature peaks may be lowered or decreased whereby the control of the one or more compressors is changed less. The one or more compressors are then more seldom turned on and off, and the wear of the one or more compressors can be kept down.

According to some embodiments, the method comprises using one or more temperature setpoints, wherein each temperature setpoint is related to a respective number of compressors of the one or more compressors that should be active at that temperature setpoint. The operating comprises activating and deactivating the one or more compressors based on the one or more temperature setpoints and the measured OUT-temperature. Thereby the numbers of compressors being active at a certain OUT-temperature can be efficiently controlled.

According to some embodiments, a first temperature setpoint defines a first number of compressors of the one or more compressors being active at the first temperature setpoint, and a second temperature setpoint defines a second number of compressors of the one or more compressors being active at the second temperature setpoint, wherein the first temperature setpoint is lower than the second temperature setpoint, and the first number of compressors is lower than the second number of compressors. Thus, the number of compressors being active is increased the greater the OUT-temperature is.

According to some embodiments, the configuring comprises determining the one or more temperature setpoints based on a variation in the measured IN-temperature. Thereby the temperature setpoints can be adapted to changes in the incoming milk flow to the milk-cooling heat exchanger such that the milk can be cooled down more efficiently.

According to some embodiments, the configuring comprises increasing a number of compressors of the one or more compressors being active at a certain OUT-temperature, in response to an increase of the measured IN-temperature reaching or exceeding a first threshold value. Thereby the chiller will use more compressors than before to cool down the coolant to the desired OUT-temperature and react earlier to an increased milk flow and/or increased temperature of the incoming milk to the milk-cooling heat exchanger.

According to some embodiments, the increasing of the number of compressors of the one or more compressors being active at a certain OUT-temperature comprises decreasing the temperature setpoints, in response to an increase of the measured IN-temperature reaching or exceeding the first threshold value. Thus, by decreasing the temperature setpoints, the one or more compressors will be activated at a lower OUT-temperature than before, respectively, whereby the capacity of the chiller coolant will be adapted earlier, thus the chiller will respond faster, to an increased cooling load in the milk-cooling heat exchanger than before.

According to some embodiments, a degree of decreasing the temperature setpoints is related to a degree of increase of the measured IN-temperature. In some embodiments, an increasing of a number of compressors of the one or more compressors being active at a certain OUT-temperature comprises decreasing the temperature setpoints with a first value, in response to the increase reaching or exceeding the first threshold value, and decreasing the temperature setpoints with a second value, in response to the increase reaching or exceeding a second threshold value, wherein the second value is greater than the first value and the second threshold value is greater than the first threshold value. Thus, the greater the increase, the greater the decrease of the temperature of the temperature setpoints.

According to some embodiments, the increasing of a number of compressors of the one or more compressors being active at a certain OUT-temperature comprises decreasing the temperature setpoints with a third value, in response to the increase reaching or exceeding a third threshold value, wherein the third value is greater than the second value and the third threshold value is greater than the second threshold value.

According to some embodiments, the configuring comprises decreasing the number of compressors of the one or more compressors being active at a certain OUT-temperature, in response to a decrease of the measured IN-temperature reaching or going below a fourth threshold value. Thereby the chiller will use less compressors than before to cool down the coolant to the desired OUT-temperature, and thereby the chiller reacts earlier to a decreased milk flow and/or decreased temperature of the incoming milk to the milk-cooling heat exchanger.

According to some embodiments, decreasing the number of compressors of the one or more compressors being active at a certain OUT-temperature comprises increasing the temperature setpoints, in response to the decrease of the measured IN-temperature reaching or going below the fourth threshold value. Thus, by increasing the temperature setpoints, the one or more compressors will be deactivated at a higher OUT-temperature than before, respectively, whereby the capacity of the chiller will be adapted earlier to a decreased cooling load in the milk-cooling heat exchanger than before.

According to some embodiments, a degree of increasing the temperature setpoints is related to a degree of decrease of the measured IN-temperature. In some embodiments, the method comprises increasing the temperature setpoints with a fourth value in response to the decrease reaching or going below the fourth threshold value, and increasing the temperature setpoints with a fifth value, in response to the decrease reaching or going below a fifth threshold value, wherein the fifth value is greater than the fourth value and the fifth threshold value is smaller than the fourth threshold value. Thus, the greater the decrease, the greater the increase of the temperature of the temperature setpoints.

According to some embodiments, decreasing the number of compressors of the one or more compressors being active at a certain OUT temperature comprises increasing the temperature setpoints with a sixth value, in response to the decrease in difference reaching or going below the second threshold value with a sixth difference value, wherein the sixth value is greater than the fifth value, wherein the sixth threshold value is smaller than the fifth threshold value.

According to some embodiments, the method comprises continually measuring the temperatures and controlling operation of the one or more compressors based on the measured temperatures. Thus, the method may be performed through the whole milking process, thus, as long as there is incoming milk to the milk-cooling heat exchanger.

According to some embodiments, all compressors of the one or more compressors have the same capacity.

According to some embodiments, the one or more compressors is a plurality of compressors. Thus, the milk-cooling apparatus may comprise a refrigerant circuit with a cooling capacity that is variable to a large extent.

According to a second aspect, the disclosure relates to a milk-cooling apparatus for cooling down milk. The milk-cooling apparatus comprises a coolant circuit arranged for circulating coolant, wherein the coolant circuit comprises a milk-cooling heat exchanger configured for heat exchange between milk and the coolant. The milk-cooling apparatus further comprises a chiller comprising a refrigerant circuit comprising a coolant-cooling heat exchanger configured for heat exchange between a refrigerant and the coolant, and wherein the refrigerant circuit further comprises one or more compressors arranged for compressing the refrigerant in a cool down process of the refrigerant. The milk-cooling apparatus further comprises a first temperature sensing device configured to measure an OUT-temperature indicative of a temperature of the coolant upstream the milk-cooling heat exchanger and downstream the coolant-cooling heat exchanger, and a control circuitry configured to operate the plurality of compressors based on the measured OUT-temperature, in order to minimize a difference between the measured OUT-temperature and a desired OUT-temperature. The milk-cooling apparatus further comprises a second temperature sensing device configured to measure an IN-temperature of the coolant indicative of the temperature of the coolant upstream the coolant-cooling heat exchanger and downstream the milk-cooling heat exchanger. The control circuitry is further configured to configure a number of active compressors comprising to adapt the number of compressors of the one or more compressors being active at a certain OUT-temperature based on the measured IN-temperature. In some embodiments, the milk-cooling apparatus is arranged to perform any steps of the method as disclosed in relation to the first aspect, and in any other embodiment of the method or any example as disclosed in the summary, the detailed description and the figures.

According to a third aspect, the disclosure relates to a computer program comprising instructions to cause the milk-cooling apparatus of the second aspect, to execute the steps of the method according to the first aspect.

According to a fourth aspect, the disclosure relates to a computer-readable medium having stored thereon the computer program of the third aspect.

DETAILED DESCRIPTION

In the following disclosure, embodiments of a milk-cooling apparatus and methods for controlling cooling of milk in a milk-cooling apparatus will be explained. The milk-cooling apparatus comprises a chiller comprising a refrigerant circuit, and a coolant circuit which is in heat transferring contact with milk in a milk-cooling heat exchanger. The coolant circuit comprises part of the chiller and is configured to exchange heat between the coolant and the refrigerant in a coolant-cooling heat exchanger. The refrigerant circuit comprises one or more compressors used in a cool down process of the refrigerant.

The cooling of the milk is performed by cooling the coolant towards a desired OUT-temperature of the coolant, typically 1-2 degrees cooler than a desired temperature of the milk outputted from the milk-cooling heat exchanger. The coolant is circulated in the coolant circuit by means of a pump. The refrigerant used to cool down the coolant to the desired OUT-temperature is cooled down using one or more compressors compressing gaseous refrigerant. In order to increase the cooling capacity in the refrigeration circuit (and thus in the coolant circuit), the number of active compressors at a certain OUT-temperature may be increased. Thus, more compressors are being activated to compress the refrigerant at a certain OUT-temperature. In order to decrease the cooling capacity, the number of active compressors may be decreased. Thus, less compressors are active at a certain OUT-temperature to compress the refrigerant. The present disclosure provides a method for controlling the cooling capacity based on the measured OUT-temperature and the measured IN-temperature. The IN-temperature of the coolant is measured downstream the milk-cooling heat exchanger and upstream the coolant-cooling heat exchanger and is indicative of the result of the heat exchange in the milk-cooling heat exchanger. By adapting the numbers of compressors to be active at a certain OUT-temperature based on the measured IN-temperature, adaptations of the capacity to fluctuations in milk flow can be made more efficiently than in previous solutions where the chiller is chasing the desired OUT-temperature and will first respond to any changes in the milk flow after the OUT-temperature has been measured. A higher milk flow will increase the temperature of the coolant compared to a lower milk flow, if the temperature of the milk is the same. By increasing the number of compressors to be active at a certain OUT-temperature, the coolant becomes cooler at a lower OUT-temperature than without increasing the number of compressors at the same certain OUT-temperature, and the milk can be cooled down more efficiently. A certain OUT-temperature here means any value the OUT-temperature could attain. Another positive effect of the adaptation of the number of compressors being active is that the compressors are activated and deactivated less number of times than before, thereby reducing wear to the compressors. The capacity of the chiller is adapted based on the measured IN-temperature, such that the chiller can react faster to changes in the warm milk flow and thereby cool down the milk in the milk-cooling heat exchanger more efficiently. As the chiller reacts earlier to changes, the OUT-temperature peaks may be lowered or decreased whereby the control of the one or more compressors is changed less. The one or more compressors are then more seldom turned on and off, and the wear of the one or more compressors can be kept down. A compressor typically has a predefined maximum allowed number of activation and deactivation occasions per milking session in order to have a certain lifetime. The predefined maximum allowed number is typically set by the manufacturer. The disclosed method facilitates not exceeding the occasions.

A milk-cooling heat exchanger is for example a plate heat exchanger (PHE). A PHE typically comprises a series of thin stainless steel plates. The coolant flows on one side of the plates while milk flows on the other side of the plates. Heat is transferred from the milk to the coolant via the plates.

A storage tank is a tank arranged to store and cool down milk. It is typically made of stainless steel and is often insulated to reduce the risk of ambient heat warming up the milk. It also comprises some kind of arrangement for moving around the milk in the tank, such as one or more agitators or agitating nozzles.

A chiller is an apparatus arranged to cool down a coolant to be used for cooling milk in one or more milk-cooling heat exchangers and/or one or more milk storage tanks. The chiller comprises a refrigerant circuit that may include one or several refrigerant paths for circulating refrigerant. The chiller typically works by vapor compression or vapor absorption. The chiller has some basic components such as an evaporator, a compressor, a condenser, an expansion unit and a refrigerant. In the evaporator, the refrigerant evaporates and takes heat out of the coolant. These basic components may be scaled up to a plurality of evaporators, a plurality of compressors, a plurality of condensers and/or a plurality of expansion units.

A coolant is a fluid having a suitably low freezing temperature. For example, the fluid may comprise a mixture of water and an anti-freeze agent. The anti-freeze agent is for example glycol, for example propylene glycol such as mono propylene glycol (MPG). Thereby the coolant may be cooled down to sub-zero degrees Celsius by the refrigerant without the risk of freezing.

In the following a milking arrangement will be explained in relation to FIG. 1. The milking arrangement comprises a milk-cooling apparatus 1 according to a first embodiment, a milking system 40 and a milk storage tank 50. The milking arrangement is arranged to extract milk from at least on animal in the milking system 40, pass the milk to the milk-cooling apparatus 1 where it is cooled down and thereafter pass the cooled milk to the milk storage tank 50. The milk-cooling apparatus 1 is thus arranged in a milk fluid path downstream the milking system 40. The milking system 40 may be an automatic milking system, AMS, comprising a robot arm (not shown) for automatic attachment of teat cups 43 to the teats of animals. Alternatively, the milking system 40 is a milking system wherein teat cups are manually attached to the teats of the animals. The milking system 40 is configured for extracting milk from the teats of animals standing in a milking parlour (not shown). A milking parlour may be configured for housing one or more animals simultaneously. The milking system 40 comprises teat cups 43 and a vacuum system 44 operated in a known manner. Milk extracted in the milking system 40 is led via the milk fluid path to the milk storage tank 50. The milking system 40 comprises a milk pump 41 configured to produce a milk flow from the milking system 40 towards the milk storage tank 50. Milk may be collected in a container 42 of the milking system 40, from which container 42 the milk is pumped by the milk pump 41 towards the milk storage tank 50. In embodiments wherein the milking system 40 comprise an AMS, for one animal, the container 42 may be an end unit or a receiver, where from milk is pumped by the milk pump 41 after milking of an animal has ended. In embodiments wherein the milking system 40 is configured for milking several animals at once, the container 42 may be a balance tank. Milk may be pumped from the balance tank by the milk pump 41 once the balance tank is filled to a certain degree. The balance tank may be provided with a level sensor to detect the level of milk in the tank. The latter type of milking system may be a milking system wherein teat cups are attached manually to the animals, or a larger automatic milking system. The milking system 40 is connected with the milk-cooling apparatus 1 by means of a first milk conduit 45.

The milk-cooling apparatus 1 comprises a coolant circuit 51 arranged for circulating coolant. The coolant circuit 51 comprises a milk-cooling heat exchanger 2 configured for heat exchange between milk and the coolant. The milk-cooling apparatus 1 further comprises a chiller 3, a first temperature sensing device 7, a control circuitry 5 and a second temperature sensing device 10. The coolant circuit 51 further comprises a fluid path comprising a cooling path 4a in the chiller 3, a first coolant path 2a in the milk-cooling heat exchanger, a first conduit 6 and a second conduit 4. The coolant can thus circulate in the fluid path of the coolant circuit 51. The coolant is cooled in the cooling path 4a in the chiller 3 by means of heat exchange with the refrigerant. The cooled coolant is then passed via the first conduit 6 to the first coolant path 2a of the milk-cooling heat exchanger 2, where it absorbs heat via heat exchange with milk flowing in a fluid path 2b for milk. Thereafter the coolant is passed via the second conduit 4 back to the cooling path 4a, where it is cooled down again. The fluid path 2b for milk is part of the milk fluid path between the milking system 40 and the milk storage tank 50. A portion of the coolant circuit 51 is thus arranged in the milk fluid path.

The chiller 3 comprises a refrigerant circuit 53. The refrigerant circuit 53 comprises a coolant-cooling heat exchanger 52 configured for heat exchange between a refrigerant and the coolant. The refrigerant circuit 53 further comprises a plurality of compressors 12 (12a-12f) arranged for compressing the refrigerant in a cool down process of the refrigerant. However, in some embodiments the refrigerant circuit 53 only comprises one compressor 12 (see 12a, FIG. 2). Hence, the refrigerant circuit 53 generally comprises one or more compressors 12. The chiller 3 also comprises an outlet port 31 and an inlet port 32. The inlet port 32 connects the coolant path 4a with the first conduit 6 and the second conduit 4. In some embodiments, the chiller 3 comprises a separate control unit (not shown). During the heat exchange between the refrigerant and the coolant in the refrigerant circuit 53, the coolant is cooled by the refrigerant and the refrigerant is heated by the coolant. The refrigerant circuit 53 as such may be automatically controlled in a commonly known manner.

The first temperature sensing device 7 is configured to measure an OUT-temperature indicative of a temperature of the coolant upstream the milk-cooling heat exchanger 2 and downstream the coolant-cooling heat exchanger 52. The measured OUT-temperature is provided to the control circuitry 5. For example, the first temperature sensing device 7 continually sends the measured values of the OUT-temperatures to the control circuitry 5. Alternatively, the control circuitry 5 collects the measured values of the OUT-temperatures.

The second temperature sensing device 10 is configured to measure an IN-temperature of the coolant indicative of the temperature of the coolant upstream the coolant-cooling heat exchanger 52 and downstream the milk-cooling heat exchanger 2. The measured IN-temperature is provided to the control circuitry 5. For example, the second temperature sensing device 10 continually sends the measured values of the IN-temperatures to the control circuitry 5. Alternatively, the control circuitry 5 collects the measured values of the IN-temperatures.

In some embodiments the milking system 40 is configured to generate information, for example a first signal or data message, that warm milk that needs to be cooled down is coming in to (or arriving at) the milk-cooling heat exchanger 2. In some embodiments, the milking system 40 is configured to generate information, for example a second signal or data message, that milk has stopped coming in (ceased to arrive) to the milk-cooling heat exchanger 2.

The milk-cooling heat exchanger 2 comprises an inlet port 15 and an outlet port 16. The inlet port 15 and an outlet port 16 connect the first coolant path 2a with the first conduit 6 and the second conduit 4. The milk-cooling heat exchanger 2 further comprises a first milk path 2b for circulating milk. If the milk-cooling heat exchanger is a PHE, the first coolant path 2a and the first milk path 2b are for example separated by plates. A heat exchange between the milk and the coolant is obtained along the extent of the first coolant path 2a and the first milk path 2b. In the heat exchange between the coolant and the milk, the milk is cooled and the coolant is heated. The milk may be cooled substantially to the milk storage temperature by the coolant.

The milk storage tank 50 is arranged to receive milk from the milk-cooling heat exchanger 2 via a second milk conduit 46. The milk storage tank 50 may be a permanent milk storage tank 50 or a moveable milk storage tank 50 for example arranged to a truck.

The control circuitry 5 may be a dedicated controller for the milk-cooling apparatus 1. Alternatively, the control circuitry 5 may form part of a control unit of the milking system 40 (not shown) and/or a control unit of the chiller 3 and/or a control unit 8 of the milk storage tank 50. The control circuitry 5 may comprise two or more separate control units, each of the control units being configured to control separate parts of the milking arrangement. The one or more separate control units may be configured to communicate with each other or to operate independently of each other without communicating with each other. The control circuitry 5 comprises a processor 5a, memory 5b and a communication interface 5c. The processor 5a comprises one or more processing units, such as one or more Central Processing Units (CPUs). The memory 5b comprises one or more memory units. The communication interface 5c is configured for communication of signals and/or data to and from the control circuitry 5, in order to control and monitor operation of the milk-cooling apparatus 1. The communication interface 5c may also comprise a user interface (not shown). The user interface may be a remote user interface. The user interface may comprise an input device such as a touch screen, keyboard or microphone. The control circuitry 5 may also be at least partly be remotely distributed, e.g. to "a cloud server". Data may then be communicated via the communication interface to the cloud, or directly from sensors to the cloud. The data may then be processed in the cloud (cloud computing), and control data or signals sent back to the control circuitry 5. Thus, milk-cooling apparatus 1 may be controlled via control circuitry 5 such as a programmable logic controller (PLC), an edge computer, the cloud server, a Personal Computer (PC), a smart device, etc. The control circuitry 5 is arranged to send control signals to the various components of the chiller 3 such as a pump 27, one or more compressors 12 (FIGS. 1-2, 4-6) via its communication interface 5c in order to control their functions. In particular, the control circuitry 5 is configured to individually control each compressor of the one of more compressors 12 to turn on or off, thus, to individually activate or deactivate each compressor of the one or more compressors. The control circuitry 5 is also arranged to receive monitored, sensed or measured signals from the chiller 3, and signals and/or data from the milking system 40, via its communication interface 5c. The control circuitry 5 is configured to control a cool down process of the coolant in the chiller 3. The control circuit 5 is also arranged to provide a fluid flow of coolant in the coolant circuit 51 by means of the pump 27 (see FIG. 2). In some embodiments, the control circuitry 5 is configured to receive information, for example a first signal or data message, from the milking system 40 that milk is incoming to the milk-cooling heat exchanger 2 that needs to be cooled down. In response to such information, the control circuitry 5 sends control signals to the chiller 3 to start cooling and pumping the coolant. In some embodiments, the control circuitry 5 is configured to receive information, for example a second signal or data message, from the milking system 40 that milk has stopped coming to the milk-cooling heat exchanger 2. In response to such information, the control circuitry 5 sends control signals to the chiller 3 to stop cooling and pumping the coolant. In some embodiments, the control circuitry 5 is arranged to provide an indication to an operator of the current cooling process of the milk-cooling apparatus 1. For example, the temperature of the coolant, how many compressors that are being active, temperature setpoints etc. The indication may be transmitted to the operator as sound, electronic message etc., via the user interface. The indication may alternatively be transmitted to a smart device such as a mobile phone of the user.

Figure 2:
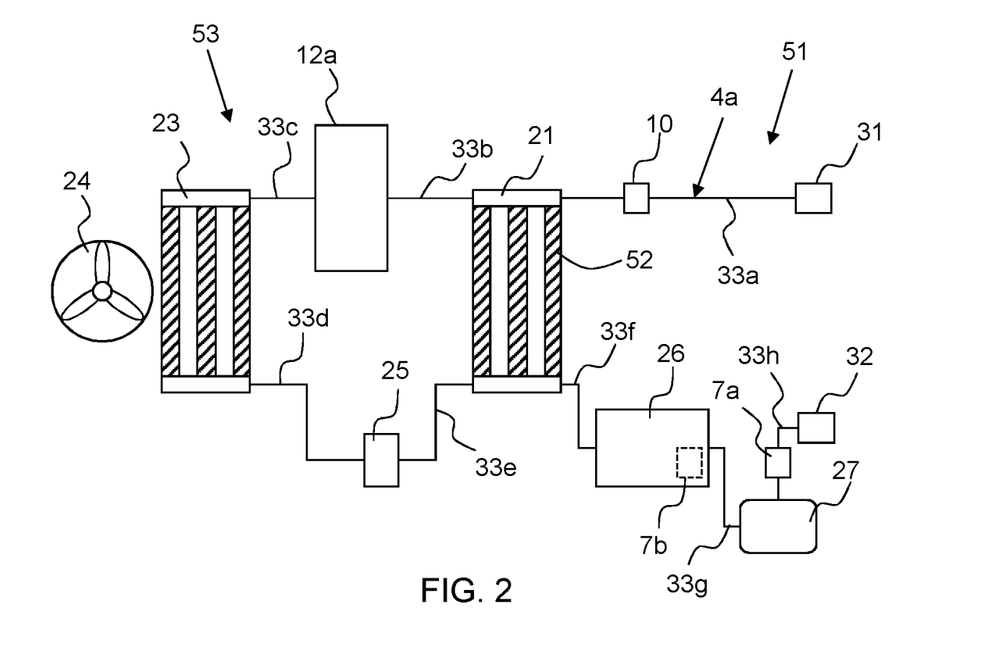
FIG. 2 illustrates a coolant circuit of a chiller according to some embodiments.

FIG. 2 illustrates a refrigerant circuit 53 of the chiller 3, and a coolant path 4a being part of the coolant circuit 51, according to one example embodiment. The refrigerant circuit 53 is arranged to circulate a refrigerant. The refrigerant circuit 53 comprises an evaporator 21, a first compressor 12a, a condenser 23 and an expansion valve 25. A first refrigerant conduit 33b is connected between a refrigerant outlet of the evaporator 21 and an inlet of the first compressor 12a. A second refrigerant conduit 33c is connected between an outlet of the first compressor 12a and an inlet of the condenser 23. A third refrigerant conduit 33d is connected between an outlet of the condenser 23 and an inlet of the expansion valve 25. A fourth refrigerant conduit 33e is connected between an outlet of the expansion valve 25 and a refrigerant inlet of the evaporator 21. The coolant path 4a comprises the evaporator 21, a tank 26 and the pump 27. A first coolant conduit 33a is connected between the inlet port 31 and a coolant inlet of the evaporator 21. A second coolant conduit 33f is connected between a coolant outlet of the evaporator 21 and an inlet of the tank 26. A third coolant conduit 33g is connected between an outlet of the tank 26 and an inlet of the pump 27. A fourth coolant conduit 33h is connected between an outlet of the pump 27 and to the outlet port 32. A first temperature sensing device 7a is arranged to sense the OUT-temperature of the coolant downstream the coolant-cooling heat exchanger 52 and upstream the milk-cooling heat exchanger 2. More precisely, the coolant in the fourth coolant conduit 33h. Another first temperature sensing device 7b is arranged to sense the temperature of the coolant in the tank 26. A second temperature sensing device 10 is arranged to sense the IN-temperature of the coolant upstream the coolant-cooling heat exchanger 52 and downstream the milk-cooling heat exchanger 2. More precisely, the coolant in the first coolant conduit 33a. In the evaporator 21, the refrigerant is evaporated and consequently takes heat from the coolant. The refrigerant is thereafter passed to the condenser 23. The first compressor 12a uses the gas pump to create low pressure in the evaporator 21. In the condenser 23 the refrigerant condenses. The heat in the gas is released to air or to another medium, and the gas turns into liquid. The fan 24 removes heated air. The expansion valve 25 gives the same amount of refrigerant, in a liquid form, back to the evaporator 21 as the first compressor 12a takes out as a gas. The first compressor 12a is for example a reciprocating, rotary or centrifugal compressor. The gas pump operating the compressor is for example an electric pump. The capacity of a compressor, and hence the chiller cooling capacity, is measured in kilowatts input (KW), Horse power input (HP), or volumetric flow ($m^3/h$, $ft^3/h$). In refrigerant circuits comprising a plurality of compressors, all the compressors may have the same capacity. Thus, they have the same power. Alternatively, some or all of the plurality of compressors may individually have different capacity, thus different power. For example, one or two compressors of the one or more compressors 12 are more powerful than the other compressors. Then these compressors may be chosen to be operated more than the other compressors.

Figure 1:
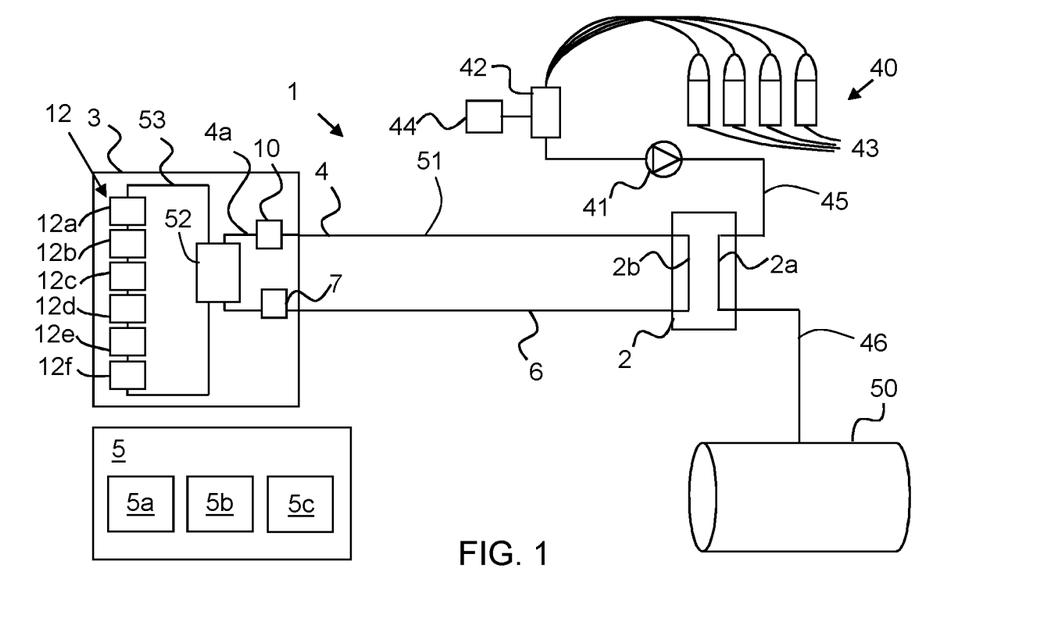
FIG. 1 illustrates a milk-cooling arrangement according to a first example.

The coolant is provided at the inlet port 31 from the thereto connected second conduit 4 (FIG. 1). In the evaporator 21, heat is taken from the coolant whereby it is cooled down. The coolant is thereafter collected in the tank 26. The pump 27 pumps the coolant from the tank 26 to the outlet port 32, and to the thereto connected first conduit 6 (FIG. 1).

Figure 6:
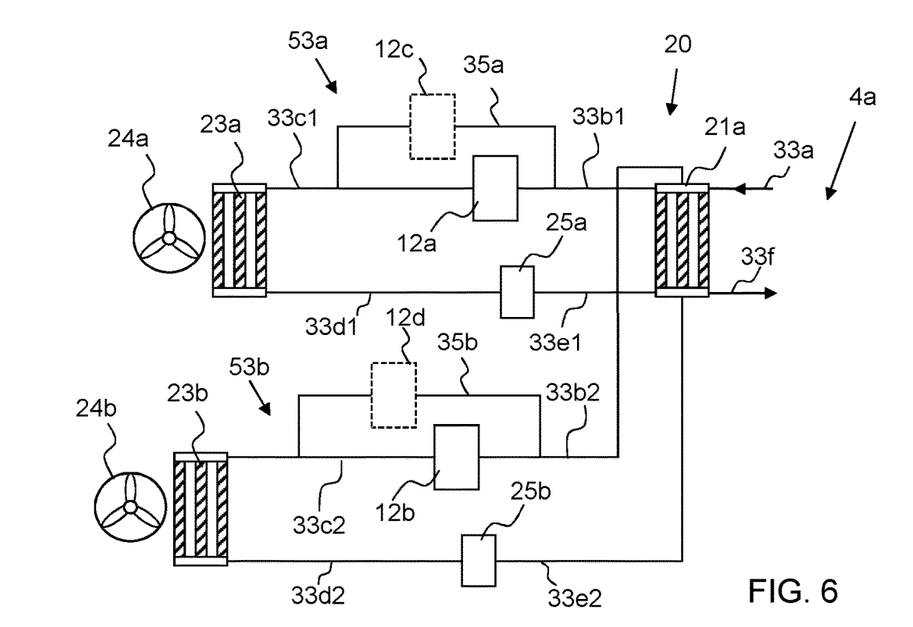
FIGS. 6-8 illustrate coolant circuits of a chiller according to some embodiments.
Figure 7:
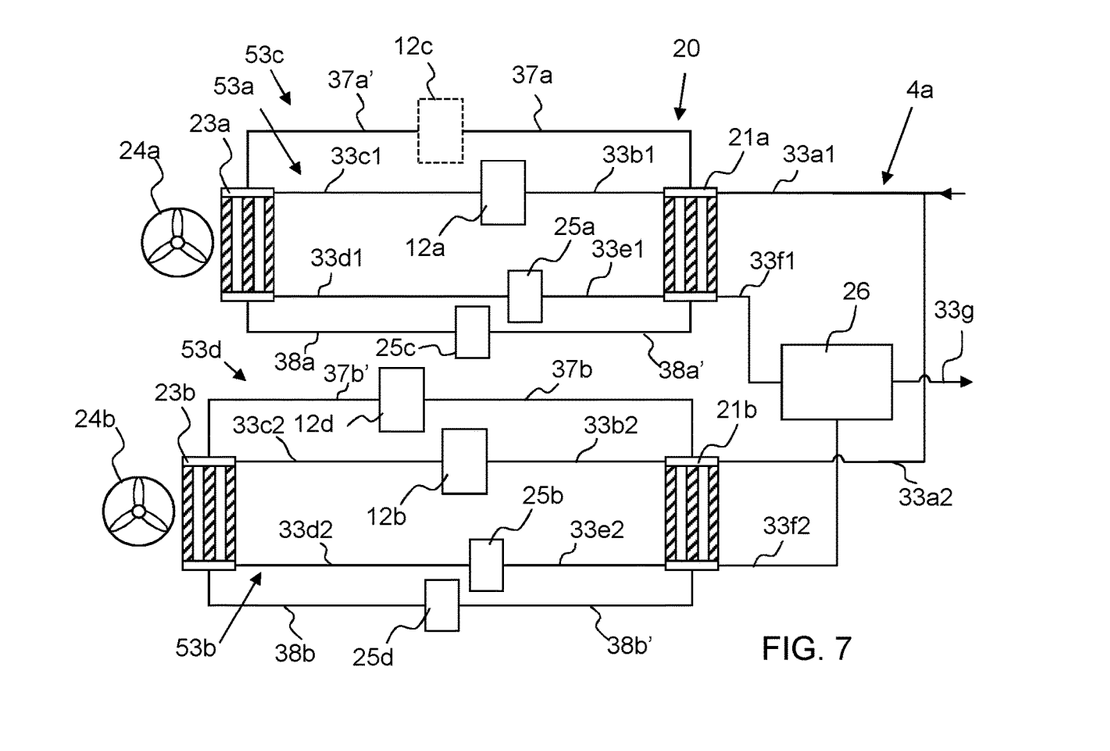
Figure 8:
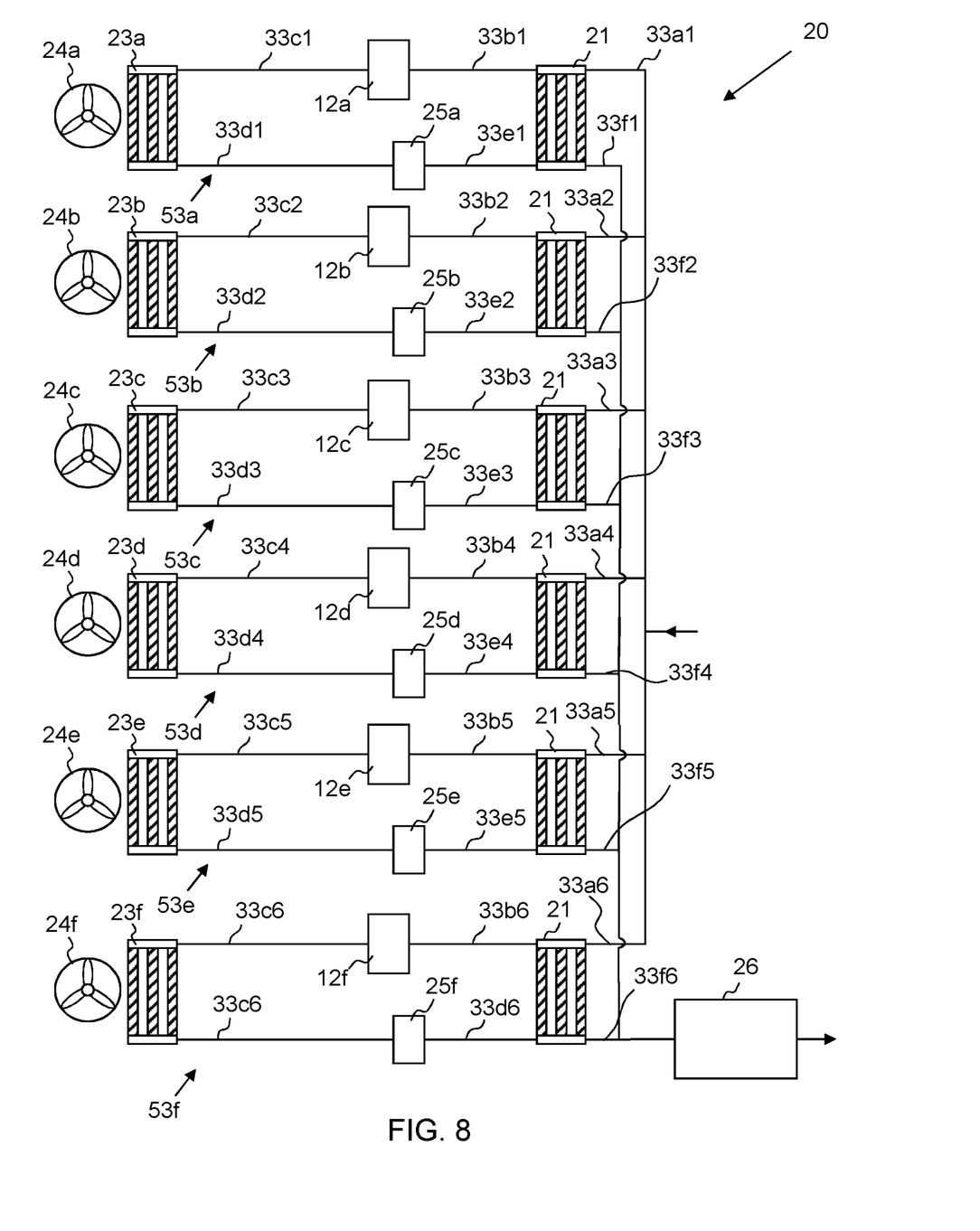

The temperature of the coolant is controlled based on the OUT-temperature of the coolant. The OUT-temperature is for example measured with the first temperature sensing device 7a or the other first temperature sensing device 7b. Based on the OUT-temperature of the coolant, the first compressor 12a is switched on and off to provide a desired cooling capacity. The OUT-temperature is compared to one or more temperature setpoints. If the OUT-temperature reaches or exceeds at least one of the one or more temperature setpoints, the first compressor 12a is switched on and the coolant is cooled down. The first compressor 12a is on, thus active, as long as the OUT-temperature is reaching (is on) or is exceeding (is above) at least one of the temperature setpoints. Such temperature setpoint may be referred to as an activation temperature setpoint. If the OUT-temperature thereafter is decreasing such that it is going below or reaching another temperature setpoint, which may be the same or another temperature setpoint than the temperature setpoint that activated the first compressor 12a, the compressor 12 is switched off. This temperature setpoint may be referred to as a deactivation temperature setpoint. The FIG. 2 is illustrating components of the chiller 3, however with only one compressor. FIGS. 6-8 illustrate chiller embodiments with a plurality of compressors 12, which will be further explained in the following. The function of any of the plurality of compressors is basically the same as the first compressor 12a, however, the individual compressors of the plurality of compressors may be activated and deactivated at other different temperature setpoints in order to provide a desired cooling capacity. For example, in some embodiments, one or more temperature setpoints are stored in the memory 5b of the control circuitry 5. In some embodiments, each temperature setpoint is related to a respective number of compressors that should be active at that temperature setpoint. The control circuitry 5 is thus configured to activate and deactivate the compressors based on the one or more temperature setpoints and the measured OUT-temperature. In other words, the temperature setpoints may include one or more activation temperature setpoints, and one or more deactivation temperature setpoints. A pair comprising one activation temperature setpoint and one deactivation temperature setpoint may define the OUT-temperature when one compressor of the one or more compressors is activated, and the following OUT-temperature when the same compressor of the one or more compressors is deactivated.

In order to mention a few examples, the coolant circuit 53 may comprise the coolant in an amount within a range of 20-1000 litres, or within a range of 20-200 litres, or within a range of 40-120 litres. The amount of coolant may suitably be selected based on the expected milk flow from the milking system 40 to the milk milk storage tank 50. The milk-cooling apparatus 1 is typically designed for the expected peak flow of milk expected from the milk pump 41 pumping milk into the milk-cooling heat exchanger 2. Several hundreds of litres may be used in milking arrangements comprising a milking parlour wherein many animals, such as e.g. 20-100 animals, are milked simultaneously, which results in a high milk flow to the milk storage tank 50. The lower exemplified ranges of coolant suffice in milking arrangements where only one animal at a time or only a few animals are milked simultaneously. The cooling capacity in the refrigerant circuit 53 is adapted to the expected milk flow and depends inter alia on the number of animals milked simultaneously in the milking system 40. A coolant flow matched to the milk flow will make the milk-cooling heat exchanger 2 easier to size and will make efficient use of the coolant. A typical coolant-to-milk ratio is 3:1, however 2:1 or 1.5:1 may also be adequate.

Figure 3:
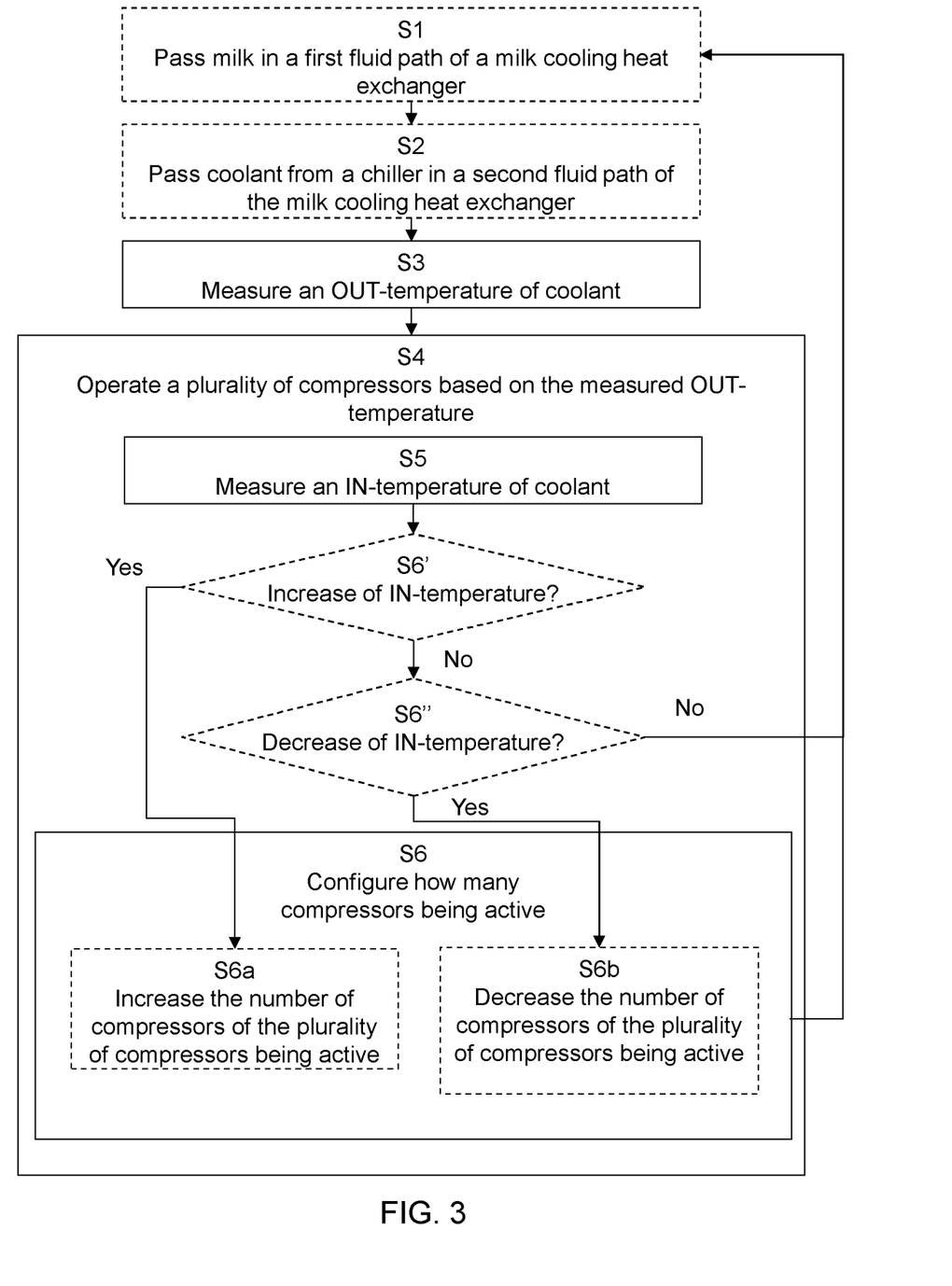
FIG. 3 is a flow chart of a method for cooling down milk in a milk-cooling apparatus according to some embodiments of the disclosure.

According to some embodiments, the control circuitry 5 stores a computer program in the memory 5b comprising instructions which, when the program is executed by the processor 5a, cause a milk-cooling apparatus to carry out a method as illustrated in the flowchart in FIG. 3 for cooling down milk. The milk-cooling apparatus is for example the milk-cooling apparatus 1 in FIG. 1, with a refrigerant circuit 53 according to any of the embodiments illustrated in FIG. 2, 6, 7 or 8. The computer program is in some embodiments stored on a computer-readable medium such as a memory, for example a flash memory.

In the following embodiments of the method for cooling down milk 1 will be explained with reference to the flow chart in FIG. 3, and the other FIGS. 1-2 and 4-8. In some embodiments, the method starts with obtaining information that milk is incoming to the milk-cooling heat exchanger 2. For example, the milking system 40 sends the information, for example a first signal, to the control circuitry 5 of the milk-cooling apparatus 1, which receives the information. The milk is pumped for example by the milk pump 41 through a milk fluid path that comprises the first milk conduit 45, the first fluid path 2a in the milk-cooling heat exchanger 2 and the second milk conduit 46. The milk is thus passed S1 in the first fluid path 2a of the milk-cooling heat exchanger 2. In response to obtaining information that milk is incoming to the milk-cooling heat exchanger 2, the milk-cooling apparatus 1 starts pumping coolant into the coolant circuit 51 thus into the second fluid path 2b and starts operating the one or more compressors 12 (and the other components of the refrigerant circuit 53) in order to cool the refrigerant. The method thus comprises passing coolant from the chiller 3 in the second fluid path 2b of the milk-cooling heat exchanger 2.

The method further comprises measuring S3 an OUT-temperature indicative of a temperature of the coolant upstream the milk-cooling heat exchanger 2 and downstream the coolant-cooling heat exchanger 52. The measuring S3 is typically continuously or continually performed. In other words, the OUT-temperature is continuously or continually monitored. The OUT-temperature is for example measured by means of the first temperature sensing device 7a or the other first temperature sensing device 7b. However, the temperature may alternatively be measured anywhere along the first conduit 6. The method comprises operating S4 the one or more compressors based on the measured OUT-temperature, in order to minimize a difference between the measured OUT-temperature and a desired OUT-temperature. Thus, the one or more compressors 12 of the refrigerant circuit 53 are operated in order to achieve the desired OUT-temperature. A compressor is operated by controlling activating or deactivating of its pump, herein generally referred to as activating or deactivating the compressor. The pump is typically set to operate at a predefined speed that corresponds to a certain capacity. In some embodiments, the method comprises using one or more temperature setpoints for operating the one or more compressors 12. Each temperature setpoint is related to, or corresponds to, a respective number of compressors of the one or more compressors 12 that should be active at that temperature setpoint. A temperature setpoint is a temperature value that regulates how many compressors that should be active at, and beyond in time, that temperature value (until another temperature setpoint is reached that sets another condition). Thus, a temperature setpoint defines how many compressors of the one or more compressors that should be active at that OUT-temperature. For example, a temperature setpoint is related to one or more compressors, for example 1, 2, 3, 4, 5, 6 or more compressors that should be active at that setpoint. No more than the related number of compressor or compressors should be active at that temperature setpoint. If a temperature setpoint is related to five compressors, and only four compressors are active when the measured OUT-temperature reaches the temperature setpoint, then another compressor is activated such that the number of active compressors becomes five. The operating S4 then comprises activating and deactivating the one or more compressors 12 based on the one or more temperature setpoints and the measured OUT-temperature. This means that at a measured OUT-temperature corresponding to a certain temperature setpoint, for example reaching or exceeding/going below a certain temperature setpoint, the number of compressors being active is changed to the number of compressors defined by that certain temperature setpoint. For example, a temperature setpoint may be defined to activate or deactivate one compressor of the one or more compressors. This will be further exemplified in the following example in FIG. 4. The one or more compressors may have the same or different capacity. In some embodiments, the method includes selecting which compressor to be activated or deactivated at different setpoints based on the capacity of the individual compressors. For example, a compressor having a large capacity is used more often than a compressor having a smaller capacity.

Figure 4:
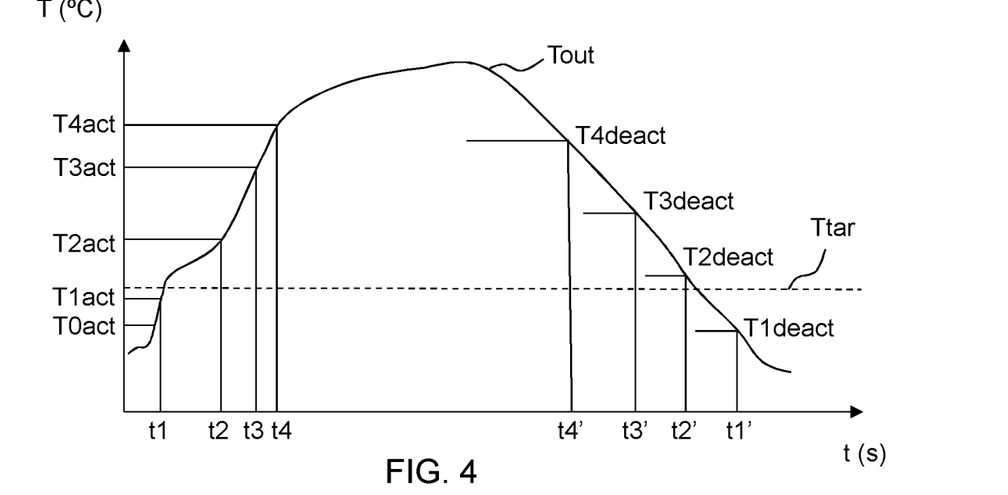
FIG. 4 is a diagram with a control scheme for controlling the plurality of compressor according to some embodiments.

Reference is now made to FIG. 4, which is a diagram illustrating a control scheme for controlling a plurality of compressor 12 according to some embodiments. The flow rate of the milk incoming to the milk-cooling heat exchanger 2 is increasing, whereby the temperature of the coolant will increase. In this example, the plurality of compressors 12 comprises four compressors. The diagram has temperature in degrees Celsius on one axis (Y-axis) and a time in seconds on the other axis (X-axis). The hatched line Ttar is the desired OUT-temperature of the coolant. The curve Tout illustrates the resulting OUT-temperature of the coolant. The temperatures T1act, T2act, T3act and T4act defines activation temperature setpoints related or corresponding to activation of the respective, individual compressors. The temperatures T4deact, T3deact, T2deact and T1deact defines deactivation temperature setpoints related or corresponding to deactivating the respective, individual compressors. The temperature setpoints may be calculated from a base temperature setpoint T0act, as will be explained further below. The illustrated temperature setpoints may include a hysteresis to avoid extensive switching at fairly stable temperature. The activation temperature setpoints are increasing in temperature from Tact to T4act, while the deactivation temperature setpoints are decreasing in temperature from T4deact to T1deact. The difference between two subsequent temperature setpoints is here a CompressorDiff value, for example 0.5° C. T1act is calculated as T0act plus a hysteresis. When the measured OUT-temperature reaches T1act, here at time t1, one compressor of the plurality of compressors 12 is activated. T1act thus defines that one compressor should be active. When the measured OUT-temperature reaches T2act, here at time t2, another compressor of the plurality of compressors 12 is activated. T2act thus defines that two compressors should be active. When the measured OUT-temperature reaches T3act, here at time t3, a further compressor of the plurality of compressors 12 is activated. T3act thus defines that three compressors should be active. When the measured OUT-temperature reaches T4act, here at time t4, a still further compressor of the plurality of compressors 12 is activated. T4act thus defines that four compressors should be active. Thus, at an OUT-temperature corresponding to T1act and at time t1, one compressor is active. At an OUT-temperature corresponding to T2act and at time t2, two compressors are active. At an OUT-temperature corresponding to T3act and at time t3, three compressors are active. At an OUT-temperature corresponding to T4act at time t4, four compressors are active. The refrigerant is now being cooled with a rather high capacity and the coolant is being cooled down by the refrigerant. Because of the cooling, the measured OUT-temperature of the coolant starts decreasing. When the measured OUT-temperature reaches T4deact, here at time t4', one compressor of the active compressors is deactivated. T4deact thus defines that three compressors should be active. When the measured OUT-temperature reaches T3deact, here at time t3', another compressor of the active compressors 12 is deactivated. T3deact thus defines that two compressors should be active. When the measured OUT-temperature reaches T2deact, here at time t2', a further compressor of the active compressors 12 is deactivated. T2deact thus defines that one compressor should be active. When the measured OUT-temperature reaches T1deact, here at time t1', the last one of the active compressors of the plurality of compressors 12 is deactivated. T1deact thus defines that no (zero) compressors should be active. Thus, between t4 and t4', four compressors were active. Between t3 and t3' at least three compressors were active. Between t2 and t2' at least two compressors were active. Between t1 and t1' at least one compressor was active. Thus, in some embodiments, a first compressor is active for the time period between t1 and t1', a second compressor is active for the time period between t2 and t2', a third compressor is active for a time period between t3 and t3' and a fourth compressor is active for a time period between t4 and t4'. Each pair of temperature setpoints T1act, T1deact; T2act, T2deact; T3act, T3deact and T4act, T4deact, respectively, may define a temperature when a compressor is activated, and a temperature when the same compressor is deactivated. Each pair of temperature setpoints may thus define an activation temperature and a deactivation temperature of one individual compressor of the one or more compressors. However, in some embodiments, one or more pairs of temperature setpoints defines an activation OUT-temperature and a deactivation OUT-temperature of several individual compressor of the one or more compressors. In some embodiments, each pair of temperature setpoints may be seen as delimiting an interval for the OUT-temperature when the OUT-temperature first increases and subsequently decreases. In the interval, one compressor of the one or more compressor is active. Outside the interval, the same compressor is not active, thus, it is off. In an alternative embodiment, a first compressor is activated at T1act and the same deactivated at T4deact, a second compressor is activated at T2act and the same deactivated at T3deact, a third compressor is activated at T3act and the same deactivated at T2deact, and a fourth compressor is activated at T4act and the same deactivated at T1deact. Then, the first compressor is active for the time period between t1 and t4', the second compressor is active for the time period between t2 and t3', the third compressor is active for a time period between t3 and t2' and the fourth compressor is active for a time period between t4 and t1'. The compressors may then be operated for more equal times. Other alternatives are of course also possible.

The diagram of FIG. 4 is illustrating only a small part of a whole milking session, so a similar scenario as the one illustrated might occur several times in a row, resulting in that the compressors are turned on and off several times (thus activated and deactivated, respectively). Thus, in some embodiments, each setpoint is individually related to a different number of compressors to be active at an OUT-temperature defined by that setpoint. For example, a first temperature setpoint defines a first number of compressors of the one or more compressors 12 being active at the first temperature setpoint. The first temperature setpoint thus defines a first temperature value at which one compressor is activated or deactivated. It thus also indirectly defines how many compressors that should be active at that first temperature value, as it activates or deactivates a compressor of a known number of compressors of which operational status (active or deactive) is known or monitored. A second temperature setpoint defines a second number of compressors of the one or more compressors 12 being active at the second temperature setpoint. The second temperature setpoint thus defines a second temperature value at which another compressor is activated or deactivated. It thus also indirectly defines how many compressors that should be active at that temperature value, as it activates or deactivates a compressor of a known number of compressors of which operational status (active or deactive) is known or monitored. The first temperature setpoint is lower than the second temperature setpoint, and the first number of compressors is lower than the second number of compressors. Thus, a greater number of compressors is activated at a higher OUT-temperature than at a lower OUT-temperature. For example, the first temperature setpoint is any of the setpoints T1act to T3act, or T1deact to T3deact (in that order). The second temperature setpoint is any of the setpoints T2act to T4act, or T2deact to T4deact (in that order), respectively. In some embodiments, the temperature setpoints includes a hysteresis. This to avoid that the compressors are being turned on and off just for very minor fluctuations in temperature.

Now returning to the flow chart in FIG. 3, the method further comprises measuring S5 an IN-temperature of the coolant indicative of the temperature of the coolant upstream the coolant-cooling heat exchanger 52 and downstream the milk-cooling heat exchanger 2. This step may be included in the operating-step (S4). The measuring S5 is typically continuously or continually performed. In other words, the IN-temperature is continuously or continually monitored. The measuring is for example done using the second temperature sensing device 10. The method further comprises configuring S6 how many compressors of the one or more compressors 12 being active at a certain OUT-temperature based on the measured IN-temperature. The reason for this is that the measured IN-temperature gives additional information in advance about a trend in the OUT-temperature of the coolant. A high measured IN-temperature typically means a high milk flow coming into the milk-cooling heat exchanger 2. A high cooling capacity is then needed even if the measured OUT-temperature is low, due to system inertia. Correspondingly, a low measured IN-temperature typically means a low milk flow incoming to the milk-cooling heat exchanger 2 and less cooling capacity is needed. Thus, the configuring S6 may include configuring how many compressors of the one or more compressors 12 being active at a certain OUT-temperature based on a variation in the measured IN-temperature. The variation may be determined as the difference between the measured IN-temperature and a reference value. The reference value is for example the desired OUT-temperature of the coolant. In other words, the number of compressors to be active at a given OUT-temperature may be adjusted depending on a difference between the measured IN-temperature and a reference value. The inventor has further realized that the values of the temperature setpoints can be made dependent on the variation of the IN-temperature. Thus, by decreasing the values of the setpoints when the IN-temperature is high, thus, a difference between the measured IN-temperature and the reference value is high, and increasing the value of the setpoints when the IN-temperature is low, thus, the difference between the measured IN-temperature and the reference value is low, the OUT-temperature of the coolant can be kept more constant. This because the cooling capacity will be adapted at a lower OUT-temperature to the actual cooling load than before. Thus, in some embodiments, the configuring S6 comprises determining the one or more temperature setpoints based on a variation in the measured IN-temperature. The determining may comprise adjusting the one or more temperature setpoints from initial values. The initial values are for example determined based on an expected average flow of warm milk, thus an expected average cooling load of the apparatus. In some embodiments, the configuring S6 comprises determining the one or more temperature setpoints based on a function of the variation in the measured IN-temperature. The function is for example:

$$\text{Base OUTtemperature setpoint} = \text{Constant} - \text{INtemperature} \quad (1)$$

where the Base OUTtemperature setpoint is the base temperature setpoint (T0act) from which all setpoints is calculated or at least based, the Constant is the reference value and the INtemperature is the measured IN-temperature. If the other temperature setpoints all have a predetermined relation to the base temperature setpoint, they may be calculated based on the relations and the base temperature setpoint. The configuring step (S6) may be included in the operating-step (S4).

Generally, in some embodiments, the configuring S6 comprises increasing S6a the number of compressors of the one or more compressors 12 being active at a certain OUT-temperature, in response to S6' an increase of the measured IN-temperature reaching or exceeding a first threshold value. In other words, in response to the IN-temperature increasing in relation to a reference value, and the difference between the measured IN-temperature and the reference value reaching or exceeding the first threshold value, the number of compressors being active at a certain OUT-temperature should increase. This corresponds to decreasing the temperature setpoints. Thereby, more compressors will be activated at a lower OUT-temperature, thus earlier, than if the temperature setpoints were not decreased. The increase is calculated as the difference between the reference value and the measured IN-temperature. In some embodiments, a degree of decreasing the temperature setpoints is related to a degree of increase of the measured IN-temperature. Thus, the larger the increase, the more the temperature setpoints are decreased. To increase the temperature setpoints means to increase the values of the temperature setpoints. To decrease the temperature setpoints means to decrease the values of the temperature setpoints.

Considering the example in FIG. 4 with four compressors. The different temperature setpoints T1act, T2act, T3act and T4act are here equal to the temperature setpoints T1deact, T2deact, T3deact and T4deact minus the hysteresis, respectively. The temperature setpoints are here calculated from a base temperature setpoint T0act as follows:

$$T1act = T0act + hysteresis; \quad (2)$$

$$T2act = T0act + hysteresis + CompressorDiff; \quad (3)$$

$$T3act = T0act + hysteresis + 2*CompressorDiff; \quad (4)$$

$$T4act = T0act + hysteresis + 3*CompressorDiff. \quad (5)$$

$$T1deact = T0act; \quad (6)$$

$$T2deact = T0act + CompressorDiff; \quad (7)$$

$$T3deact = T0act + 2*CompressorDiff; \quad (8)$$

$$T4deact = T0act + 3*CompressorDiff. \quad (9)$$

The equations (2) to (9) thus illustrate relations between the base temperature setpoint and the other temperature setpoints. In some embodiments, the CompressorDiff is 0.5° C. and the hysteresis 0.6° C. According to a first example situation, the cooling load is low because the IN-temperature of the coolant is 2° C. and the desired OUT-temperature is 1.6° C. The difference between the IN-temperature and the reference value (that is here equal to the desired OUT-temperature), is thus 0.4° C. The first threshold for increasing the setpoints is for example 1° C. As the difference 0.4° C. is less than the first threshold 1° C., there is no change in the setpoints. The T0act is 1° C. The temperature setpoints are then T1act=1.6° C., T2act=2.1° C., T3act=2.6° C. and T4act=3.1° C., T1deact=1.0° C., T2deact=1.6° C., T3deact=2.1° C. and T4deact=2.5° C. A first compressor is then activated at the temperature T1act, thus 1.6° C. The other three compressors will not be active, as the measured OUT-temperature will not reach these temperature values. After the first compressor has been activated, it will remain active as long as the measured OUT-temperature does not reach T1deact, thus 1.0° C., where it will be deactivated.

In a second example situation, the cooling load is medium because the IN-temperature of the coolant is 4° C. and the desired OUT-temperature is 1.6° C. In this example situation, the CompressorDiff is 0.5° C. and the hysteresis 0.5° C. Also in this example, the reference value is equal to the desired OUT-temperature. The difference between the IN-temperature and the desired OUT-temperature is thus 2.4° C. Because the difference has increased from zero to 2.4° C., and this difference is exceeding the first threshold, the base temperature setpoint T0act is decreased with a first value, here being 0.5° C. The resulting T0act is then 0.5° C. Thus, T1act=1.0° C., T2act=1.5° C., T3act=2.0° C., T4act=2.5° C., T1deact=0.5° C., T2deact=1.1° C., T3deact=1.6° C. and T4deact=2° C., calculated with the equations (2) to (9). A second compressor is then activated at the temperature T2act, thus 1.5° C. The other two compressors will not be active, as the measured OUT-temperature will not reach these temperature values. After the second compressor has been activated, it will remain active as long as the measured OUT-temperature does not reach T2deact, thus 1.1° C., where it will be deactivated. Thus, in some embodiments, the increasing S6a a number of compressors of the one or more compressors 12 being active at a certain OUT-temperature comprises decreasing the temperature setpoints with a first value, in response to the increase of the measured IN-temperature reaching or exceeding the first threshold value.

In a third example situation, the cooling load is high because the IN-temperature of the coolant is 6° C. and the desired OUT-temperature is 1.6° C. In this embodiment, the CompressorDiff is 0.5° C. and the hysteresis 0.5° C. Also in this example, the reference value is equal to the desired OUT-temperature. The difference between the IN-temperature and the desired OUT-temperature is thus 4.4° C. Because the difference has increased from zero to 4.4° C., and this difference is exceeding a second threshold value, here 4° C., the base temperature setpoint T0act is decreased with a second value, here being 4° C., and T0act is thus −3° C. (decreased from low 1° C. level with 4° C.). Thus, T1act=−2.5° C., T2act=−2° C., T3act=−1.5° C., T4act=−1.0° C., T1deact=−3° C., T2deact=−2.5° C., T3deact=−2.0° C. and T4deact=−1.5° C., calculated with the equations (2) to (9). A third compressor is then activated at the temperature T3act, thus −1.5° C., and a fourth compressor is activated at the temperature T4act, thus −1.0° C. Thus, all compressors will be active in this example situation. After the third compressor has been activated, it will remain active as long as the measured OUT-temperature does not reach T3deact, thus −2.0° C., where it will be deactivated. After the fourth compressor has been activated, it will remain active as long as the measured OUT-temperature does not reach T4deact, thus −1.5° C., where it will be deactivated. Thus, in some embodiments, the increasing S6a a number of compressors of the one or more compressors 12 being active at a certain OUT-temperature comprises decreasing the temperature setpoints with a second value, in response to the increase reaching or exceeding a second threshold value. The second value is greater than the first value. The second threshold value is greater than the first threshold value.

As understood, this could be applied to a higher or a lower number of compressors than the illustrated number of compressors. For example, in some embodiments, the increasing S6a a number of compressors of the one or more compressors 12 being active at a certain OUT-temperature comprises decreasing the temperature setpoints with a third value, in response to the increase reaching or exceeding a third threshold value. The third value is greater than the second value. The third threshold value is greater than the second threshold value.

A corresponding procedure for configuring the temperature setpoints may be performed in situations when the IN-temperature is decreasing instead of increasing. As long as the IN-temperature does not change, there is also no change in temperature setpoints. Thus, in some embodiments, the configuring S6 comprises decreasing S6b the number of compressors of the one or more compressors being active at a certain OUT-temperature, in response to S6" a decrease of the measured IN-temperature reaching or going below a fourth threshold value. For example, in some embodiments, the decreasing S6b the number of compressors of the one or more compressors 12 being active at a certain OUT-temperature comprises increasing the temperature setpoints, in response to the decrease of the measured IN-temperature reaching or going below the fourth threshold value. In some embodiments, the degree of increasing the temperature setpoints is related to a degree of decrease of the measured IN-temperature. Thus, the decreasing S6b the number of compressors of the one or more compressors 12 being active at a certain OUT-temperature comprises increasing the temperature setpoints with a fourth value in response to the decrease reaching or going below the fourth threshold value. The method further comprises increasing the temperature setpoints with a fifth value, in response to the decrease reaching or going below a fifth threshold value. The fifth value is greater than the fourth value. The fifth threshold value is smaller than the fourth threshold value. This can be continued for smaller and smaller differences until the difference between the IN-temperature and the reference value is zero. For example, in some embodiments, the decreasing S6b the number of compressors of the one or more compressors 12 being active at a certain OUT-temperature comprises increasing the temperature setpoints with a sixth value, in response to the decrease reaching or going below the second threshold value with a sixth difference value. The sixth value is greater than the fifth value. The sixth threshold value is smaller than the fifth threshold value.

The method is performed while there is a cooling need and the coolant is circulated in the coolant circuit. Thus, the method comprises continually measuring the temperatures and controlling operation of the one or more compressors 12 based on the measured temperatures.

Figure 5A:
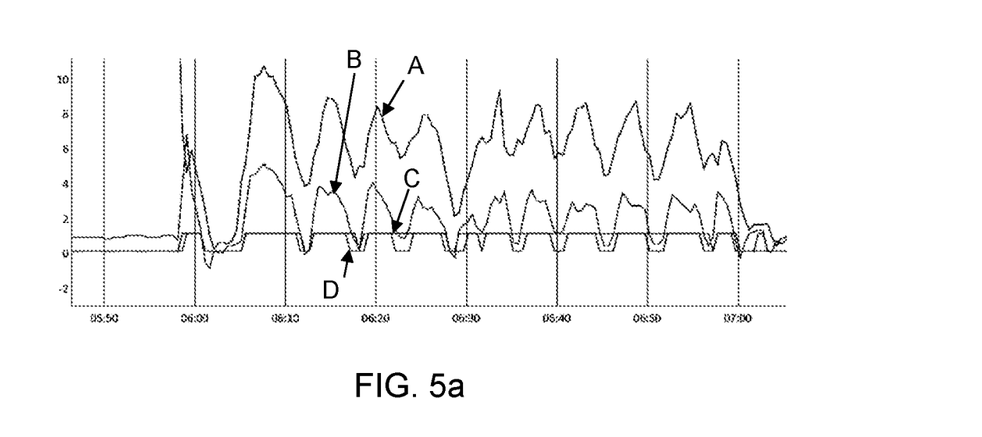
FIGS. 5a and 5b are diagrams illustrating when a first compressor and a second compressor are being operated and the resulting OUT-temperature and IN-temperature when a prior art method is used to control the two compressors and the proposed method is used to control the two compressors.
Figure 5B:
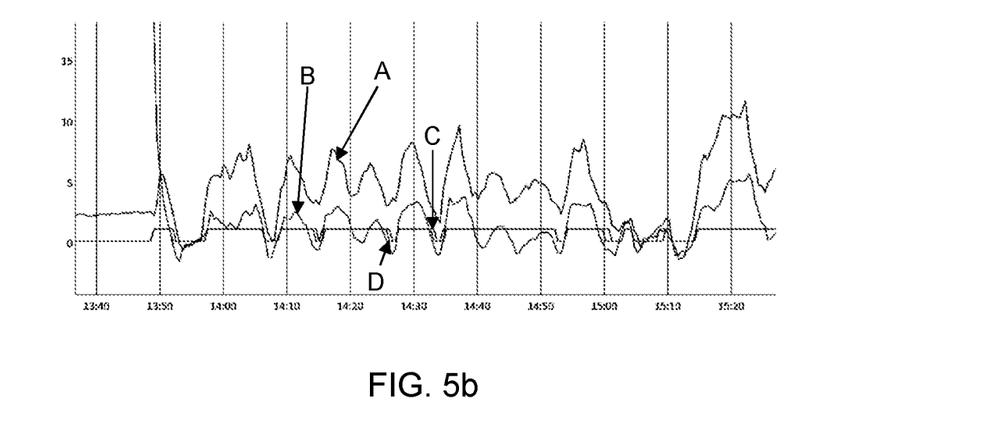

FIGS. 5a and 5b are diagrams illustrating real examples when a first compressor (curve C) and a second compressor (curve D) are active and the IN-temperature (curve A) and resulting OUT-temperature (curve B) when a prior art method is used to control the plurality of compressors (FIG. 5a) and when the present method is used to control the plurality of compressors (FIG. 5b) during one hour (6 PM to 7 PM in FIG. 5a and 2 PM to 3 PM in FIG. 5b). The example in FIG. 5b correspond to the previously explained second example situation. When a compressor is on "0" it is inactive, and when a compressor is on "1" it is active. In FIG. 5a the first compressor is activated and deactivated ten (10) times, and the second compressor is activated and deactivated seven (7) times. In FIG. 5b the first compressor is activated and deactivated five (5) times, and the second compressor is activated and deactivated five (5) times. During both time periods, the flow rate and temperature of the milk coming into the milk-cooling heat exchanger 2 were similar. Thus, the number of activation and deactivation of the compressors was reduced when using the proposed method.

FIGS. 6-8 illustrate coolant circuits 53 of a chiller 3 according to some embodiments. As should be understood, these embodiments can be scaled up and down, include more or less components such as compressors, and the different embodiments can be combined.

FIG. 6 is illustrating a coolant circuit 53 that comprises a first fluid path 53a and a second fluid path 53b. The first fluid path 53a and a second fluid path 53b are circulating a refrigerant, respectively. The first fluid path 53a comprises a first compressor 12a, a first condenser 23a, a first expansion valve 25a and a first evaporator 21a. The second fluid path 53b is an equal path to the first fluid path 53a. Thus, the second fluid path 53b comprises a second compressor 12b, a second condenser 23b, a second expansion valve 25b and the first evaporator 21a. This embodiment thus comprises two compressors. The embodiment may be scaled up to include more compressors. In some embodiments, the coolant circuit 53 comprises a third compressor 12c connected in parallel with the first compressor 12a. In some embodiments, the coolant circuit 53 comprises a fourth compressor 12d connected in parallel with the second compressor 12b. Thus, the coolant circuit 53 may be scaled up to three or four compressors. The first and third compressors will then work in tandem, and the second and fourth compressors will work in tandem. More in detail, a first refrigerant conduit 33b1 is connected between a first refrigerant outlet of a first evaporator 21a and an inlet of the first compressor 12a. A second refrigerant conduit 33c1 is connected between an outlet of the first compressor 12a and an inlet of a first condenser 23a. A third refrigerant conduit 33d1 is connected between an outlet of the first condenser 23a and an inlet of the first expansion valve 25a. A fourth refrigerant conduit 33e1 is connected between an outlet of the first expansion valve 25a and a first refrigerant inlet of the first evaporator 21a. Another first refrigerant conduit 33b2 is connected between a second refrigerant outlet of the first evaporator 21a and an inlet of the second compressor 12b. Another second refrigerant conduit 33c2 is connected between an outlet of the second compressor 12b and an inlet of the second condenser 23b. Another third refrigerant conduit 33d2 is connected between an outlet of the second condenser 23b and an inlet of the second expansion valve 25b. Another fourth refrigerant conduit 33e2 is connected between an outlet of the second expansion valve 25b and a second refrigerant inlet of the first evaporator 21a. The third compressor 12c is connected in bypass with the first compressor 12a by means of a first bypass conduit 35a. The fourth compressor 12d is connected in bypass with the third compressor 12b by means of a second bypass conduit 35b.

FIG. 7 is illustrating a coolant circuit 53 that comprises four fluid paths, namely a first fluid path 53a, a second fluid path 53b, a third fluid path 53c and a fourth fluid path 53d. The first fluid path 53a, the second fluid path 53b, the third fluid path 53c and the fourth fluid path 53d are circulating a refrigerant, respectively. The first fluid path 53a comprises the same components as illustrated in the first fluid path 53a in FIG. 6. The second fluid path 53b comprises the same components as illustrated in the second fluid path 53b in FIG. 6, however, the another first refrigerant conduit 33b2 is connected between a first refrigerant outlet of a second evaporator 21b and the inlet of the second compressor 12b, and the another fourth refrigerant conduit 33e2 is connected between the outlet of the second expansion valve 25b and a first refrigerant inlet of a second evaporator 21b. The third fluid path 53c is here a parallel fluid path to the first fluid path 53a. It comprises a third compressor 12c, the first condenser 23a, a third expansion valve 25c and the first evaporator 21a. The second fluid path 53b and the fourth fluid path 53d are equal paths to the first path 53a and the third path 53c. The fourth fluid path 53d comprises a fourth compressor 12d, the second condenser 23b, a fourth expansion valve 25d and the second evaporator 21b. In detail, a further first refrigerant conduit 37a is connected between a second refrigerant outlet of the first evaporator 21a and an inlet of the third compressor 12b. A further second refrigerant conduit 37a' is connected between an outlet of the third compressor 12c and an inlet of the first condenser 23a. A further third refrigerant conduit 38a is connected between an outlet of the first condenser 23a and an inlet of the third expansion valve 25c. A further fourth refrigerant conduit 38a' is connected between an outlet of the third expansion valve 25c and a second refrigerant inlet of the first evaporator 21a. A still further first refrigerant conduit 37b is connected between a second refrigerant outlet of the second evaporator 21b and an inlet of the fourth compressor 12d. A still further second refrigerant conduit 37b' is connected between an outlet of the fourth compressor 12d and an inlet of the second condenser 23b. A still further third refrigerant conduit 38b is connected between an outlet of the second condenser 23b and an inlet of the fourth expansion valve 25d. A still further fourth refrigerant conduit 38b' is connected between an outlet of the fourth expansion valve 25d and a second refrigerant inlet of the second evaporator 21b. The coolant circuit 51 here comprises a first coolant conduit 33a1 connected to the coolant inlet port 31 of the first evaporator 21a and another first coolant circuit 33a2 connected between the first coolant conduit 33a1 and a coolant inlet port of the second evaporator 21b. A second coolant conduit 33f1 is connected to a coolant outlet of the first evaporator 21a and an inlet of the tank 26. An additional second coolant conduit 33f2 is connected to a coolant outlet of the second evaporator 21a and an inlet of the tank 26. Thus, the coolant is collected in the tank 26 before it is pumped into the third coolant conduit 33g (see FIG. 2). In some embodiments, the third fluid path 53c and/or the fourth fluid path 53d are removed.

FIG. 8 is illustrating a coolant circuit 53 that comprises a first fluid path 53a, a second fluid path 53b, a third fluid path 53c, a fourth fluid path 53d, a fifth fluid path 53e and a sixth fluid path 53f. Each of the fluid paths is circulating a refrigerant, respectively. It should be understood that this coolant circuit 53 may be scaled up or down to include more or less fluid paths. The first fluid path 53a comprises the same components as the first fluid path 53a in FIGS. 6 and 7. The other fluid paths are equal to the first fluid path, thus, each fluid path comprises a compressor 12a, 12b, 12c, 12d, 12f, 12g, a condenser 23a, 23b, 23c, 23d, 23e, 23f, an expansion valve 25a, 25b, 25c, 25d, 25e, 25f and an evaporator 21a, 21b, 21c, 21d, 21e, 21f respectively. Each fluid path comprises a first refrigerant conduit 33b1, 33b2, 33b3, 33b4, 33b5, 33b6 connected between a first refrigerant outlet of a respective evaporator 21a, 21b, 21c, 21d, 21e, 21f and an inlet of a respective compressor 12a, 12b, 12c, 12d, 12e, 12f. Each fluid path comprises a second refrigerant conduit 33c1, 33c2, 33c3, 33c4, 33c5, 33c6 connected between an outlet of the respective compressor 12a, 12b, 12c, 12d, 12e, 12f and an inlet of a respective condenser 23a, 23b, 23c, 23d, 23e, 23f. Each fluid path comprises a third refrigerant conduit 33d1, 33d2, 33d3, 33d4, 33d5, 33d6 connected between an outlet of the respective condenser 23a, 23b, 23c, 23d, 23e, 23f and an inlet of the respective expansion valve 25a, 25b, 25c, 25d, 25e, 25f. Each fluid path also comprises a respective fourth refrigerant conduit 33e1, 33e2, 33e3, 33e4, 33e5, 33e6 connected between an outlet of the respective expansion valve 25a, 25b, 25c, 25d, 25e, 25f and a first refrigerant inlet of the respective evaporator 21a, 21b, 21c, 21d, 21e, 21f. The coolant circuit 51 here comprises a respective first coolant conduit 33a1, 33a2, 33a3, 33a4, 33a5, 33a6 connected to a coolant inlet port of a respective evaporator 21a, 21b, 21c, 21d, 21e, 21f. The coolant conduits are fluidly interconnected. The coolant circuit 51 also comprises a respective second coolant conduit 33f1, 33f2, 33f3, 33f4, 33f5, 33f6 connected to a coolant outlet of a respective evaporator 21a, 21b, 21c, 21d, 21e, 21f an inlet of the tank 26. The second coolant conduits are fluidly interconnected. Thus, the coolant is collected in the tank 26 before it is pumped into the third coolant conduit 33g (see FIG. 2).

In the embodiments of FIGS. 6-8, the coolant is passed to the tank 26 downstream the one or more evaporators. In case of a plurality of evaporators, the coolant is mixed and to equalize the temperature of the coolant and is thereafter pumped to the milk-cooling heat exchanger 2 to cool the milk.

The present disclosure is not limited to the above-described preferred embodiments. Various alternatives, modifications and equivalents may be used. Therefore, the above embodiments should not be taken as limiting the scope of the disclosure, which is defined by the appending claims.

The invention claimed is:

1. A method for cooling down milk in a milk-cooling apparatus (1) equipped with a coolant circuit (51) arranged for circulating coolant, the coolant circuit (51) including a milk-cooling heat exchanger (2) configured for heat exchange between milk and the coolant, and also equipped with a chiller (4) including a refrigerant circuit (53) with a coolant-cooling heat exchanger (52) configured for heat exchange between a refrigerant and the coolant, the refrigerant circuit (53) also including two or more compressors (12) arranged for compressing the refrigerant in a cool down process of the refrigerant, the method comprising:
measuring an OUT-temperature indicative of a temperature of the coolant upstream of the milk-cooling heat exchanger (2) and downstream of the coolant-cooling heat exchanger (52);
measuring an IN-temperature of the coolant indicative of the temperature of the coolant upstream of the coolant-cooling heat exchanger (52) and downstream of the milk-cooling heat exchanger (2); and
operating the two or more compressors based on the measured OUT-temperature, in order to minimize a difference between the measured OUT-temperature and a desired OUT-temperature,
said operating including controlling a number of active compressors among the two or more compressors (12) at a given OUT-temperature based on the measured IN-temperature, the number of active compressors (12) being increased in response to an increase of the measured IN-temperature to reach or exceed a first threshold value of temperature.

2. The method according to claim 1,
wherein said controlling comprises using one or more temperature setpoints of the measured OUT-temperature, each given one of the one or more temperature setpoints corresponding to a respective number of compressors of the two or more compressors (12) being active at the given temperature setpoint, and
wherein the operating (S4) comprises activating and deactivating selected ones of the two or more compressors based on the one or more temperature setpoints and the measured OUT-temperature.

3. The method according to claim 2,
wherein a first of the one or more temperature setpoints corresponds to a first number of the active compressors, and a second temperature setpoint corresponds to a second number of the active compressors, and
wherein the first temperature setpoint is lower than the second temperature setpoint, and the first number of the active compressors is lower than the second number of the active compressors.

4. The method according to claim 2, wherein the controlling further comprises modifying the one or more temperature setpoints based on a variation in the measured IN-temperature.

5. The method according to claim 2,
wherein the values of the temperature setpoints is decreased, in response to the increase of the measured IN-temperature reaching or exceeding the first threshold value of temperature.

6. The method according to claim 5,
wherein a value of the decrease in the temperature setpoints is related to a value of the increase of the measured IN-temperature, and
the controlling further comprises:
decreasing the temperature setpoints by a first value, in response to the increase of the measured IN-temperature to reach or exceed the first threshold value of temperature; and
decreasing the temperature setpoints by a second value, in response to an increase of the measured IN-temperature to reach or exceed a second threshold value of temperature, wherein the second value is greater than the first value and the second threshold value of temperature is greater than the first threshold value of temperature.

7. The method according to claim 6, wherein the controlling further comprises:
decreasing the temperature setpoints by a third value, in response to an increase of the measured IN-temperature to reach or exceed a third threshold value of temperature, the third value being greater than the second value and the third threshold value of temperature being greater than the second threshold value of temperature.

8. The method according to claim 7,
wherein the number of active compressors is decreased in response to a decrease of the measured IN-temperature to reach or fall below a fourth threshold value of temperature, and
wherein the values of the temperature setpoints is decreased, in response to the decrease of the measured IN-temperature is reaching or going below the fourth threshold value of temperature.

9. The method according to claim 7,
wherein a value of the increase in the temperature setpoints is related to a value of the decrease of the measured IN-temperature, and
the controlling further comprises:
increasing the temperature setpoints by a fourth value in response to the decrease of the measured IN-temperature to reach or fall below a fourth threshold value of temperature, and
increasing the temperature setpoints by a fifth value, in response to the decrease of the measured IN-temperature to reach or fall below a fifth threshold value of temperature, the fifth value being greater than the fourth value and the fifth threshold value of temperature being smaller than the fourth threshold value of temperature.

10. The method according to claim 9, wherein the controlling further comprises;
increasing the temperature setpoints by a sixth value, in response to the decrease of the measured IN-temperature to reach or fall below a sixth threshold value of temperature with a sixth difference value, the sixth value being greater than the fifth value, wherein the sixth threshold value of temperature being smaller than the fifth threshold value of temperature.

11. The method according to claim 1, wherein the number of active compressors is decreased in response to a decrease of the measured IN-temperature to reach or fall below a fourth threshold value of temperature.

12. The method according to claim 1, wherein the measuring of the OUT-temperature and the measuring (S5) of the IN-temperature are continuous, and
the operating of the two or more compressors (12) is based on the continuous measurement of the OUT-temperature and IN-temperature.

13. The method according to claim 1, wherein all compressors of the two or more compressors (12) have a same capacity.

14. A non-transitory computer-readable medium having stored thereon a computer program with instructions for execution by a processor of a controller for controlling a milk-cooling apparatus (1) equipped with a coolant circuit (51) arranged for circulating coolant, the coolant circuit (51) including a milk-cooling heat exchanger (2) configured for heat exchange between milk and the coolant, and also equipped with a chiller (4) including a refrigerant circuit (53) with a coolant-cooling heat exchanger (52) configured for heat exchange between a refrigerant and the coolant, the refrigerant circuit (53) also including two or more compressors (12) arranged for compressing the refrigerant in a cool down process of the refrigerant, the instructions configured to cause, upon execution, the processor to execute the steps of the method according to claim 1.

15. A milk-cooling apparatus (1) for cooling down milk, comprising:
a coolant circuit (51) arranged for circulating coolant, the coolant circuit (51) including a milk-cooling heat exchanger (2) configured for heat exchange between milk and the coolant;
a chiller (4) including a refrigerant circuit (53) with a coolant-cooling heat exchanger (52) configured for heat exchange between a refrigerant and the coolant, and the refrigerant circuit (53) also including two or more compressors (12) arranged for compressing the refrigerant in a cool down process of the refrigerant;
a first temperature sensing device (7) configured to measure an OUT-temperature indicative of a temperature of the coolant upstream of the milk-cooling heat exchanger (2) and downstream of the coolant-cooling heat exchanger (52);
a second temperature sensing device (10) configured to measure an IN-temperature of the coolant indicative of the temperature of the coolant upstream of the coolant-cooling heat exchanger (52) and downstream of the milk-cooling heat exchanger (2); and
a control circuitry (5) configured to operate the two or more compressors based on the measured OUT-temperature, in order to minimize a difference between the measured OUT-temperature and the desired OUT-temperature;
wherein the control circuitry (5) is further configured to control a number of active compressors of the two or more compressors (12) at a given OUT-temperature based on the measured IN-temperature, the number of active compressors (12) being increased in response to an increase of the measured IN-temperature to reach or exceed a first threshold value of temperature.

* * * * *